United States Patent [19]

Karande et al.

[11] Patent Number: 5,717,000
[45] Date of Patent: Feb. 10, 1998

[54] DESPERSIONS OF DELAMINATED PARTICLES IN POLYMER FOAMS

[75] Inventors: Seema V. Karande; Chai-Jing Chou, both of Missouri City, Tex.; Jitka H. Solc, Midland, Mich.; Kyung W. Suh, Granville, Ohio

[73] Assignee: The Dow Chemical Company, Midland, Mich.

[21] Appl. No.: 803,565

[22] Filed: Feb. 20, 1997

Related U.S. Application Data

[60] Provisional application No. 60/012,207 Feb. 23, 1996.

[51] Int. Cl.⁶ .................................................. C08J 9/00
[52] U.S. Cl. .......................... 521/83; 521/91; 521/94; 521/143; 521/144; 521/146; 521/149; 521/154
[58] Field of Search .................................. 521/143, 146, 521/144, 83, 149, 91, 154, 94

[56] References Cited

U.S. PATENT DOCUMENTS

| | | | |
|---|---|---|---|
| 3,227,666 | 1/1966 | Showalter | 260/2.5 |
| 3,625,872 | 12/1971 | Ashida | 260/2.5 |
| 3,645,922 | 2/1972 | Weiss et al. | 260/2.1 R |
| 3,979,198 | 9/1976 | Bardsley . | |
| 4,323,528 | 4/1982 | Collins . | |
| 4,365,030 | 12/1982 | Oswald et al. . | |
| 4,379,859 | 4/1983 | Hirosawa et al. . | |
| 4,464,484 | 8/1984 | Yoshimura et al. . | |
| 4,528,235 | 7/1985 | Sacks et al. | 428/220 |
| 4,618,528 | 10/1986 | Sacks et al. | 428/216 |
| 4,739,007 | 4/1988 | Okada et al. | 524/789 |
| 4,810,734 | 3/1989 | Kawasumi et al. | 523/216 |
| 4,874,728 | 10/1989 | Eilliott et al. | 501/148 |
| 4,889,885 | 12/1989 | Usuki et al. | 523/521 |
| 5,094,775 | 3/1992 | Bailey, Jr. . | |
| 5,272,236 | 12/1993 | Lai et al. . | |
| 5,278,272 | 1/1994 | Lai et al. . | |
| 5,288,762 | 2/1994 | Park et al. . | |
| 5,340,840 | 8/1994 | Park et al. . | |
| 5,346,963 | 9/1994 | Hughes et al. . | |
| 5,369,137 | 11/1994 | Paquet et al. . | |
| 5,380,767 | 1/1995 | Suh et al. . | |
| 5,385,776 | 1/1995 | Maxfield et al. | 428/331 |
| 5,434,195 | 7/1995 | Imeokparia et al. . | |
| 5,461,098 | 10/1995 | Hitchcock et al. . | |

FOREIGN PATENT DOCUMENTS

| | | |
|---|---|---|
| 93/04117 | 4/1993 | WIPO . |
| 93/04118 | 4/1993 | WIPO . |
| 93/11190 | 6/1993 | WIPO . |
| 9311190 | 6/1993 | WIPO . |
| 95/06090 | 3/1995 | WIPO . |

OTHER PUBLICATIONS

Suh, K. W. et al., "Cellular Materials", Encyclopedia of Polymer Science and Engineering, vol. 3, pp. 1–59 (1985).

Vaia, Richard A. et al., "Interlayer Structure and Molecular Environment of Alkylammonium Layered Silicates", Chemistry of Materials, vol. 6, No. 7, pp. 1017–1022 (1994).

Vaia, Richard A. et al., "Synthesis and Properties of Two–Dimensional Nanostructures by Direct Intercalation of Polymer Melts in Layered Silicates", Chemistry of Materials, vol. 5, No. 12, pp. 1694–1696 (1993).

*Primary Examiner*—Morton Foelak

[57] ABSTRACT

This invention relates to a polymer foam prepared by dispersing an organophilic multi-layered material into a melt comprising an olefinic or styrenic polymer having polar functionality so that at least a portion of the polymer intercalates between layers of the particles; and expanding the polymer with a blowing agent under such condition to form the polymer foam. The organophilic multi-layered material can also be dispersed into an olefinic or styrenic monomer, which can then be polymerized to form a polymer melt prior to, or along with the foaming step.

14 Claims, No Drawings

DESPERSIONS OF DELAMINATED PARTICLES IN POLYMER FOAMS

CROSS-REFERENCE TO RELATED APPLICATION

This application claims the benefit of U.S. Provisional Application No. 60/012,207, filed Feb. 23, 1996.

BACKGROUND OF THE INVENTION

This invention relates to polymer foams prepared from resins having dispersed therein delaminated or exfoliated organophilic multi-layered particles.

Nanocomposites, which are compositions comprising single layers such as silicate layers (about 1 to 100 nm thick) dispersed in a continuous polymer matrix, confer physical property enhancement to the polymer at a much lower ceramic content than conventionally processed glass- or mineral-reinforced polymers. These nanocomposites can be synthesized in a two-step process, with the first step being the modification of the multi-layered particles, generally by ionic exchange of sodium or potassium ions (which exist in natural forms of mica-type silicates) with organic cations (for example, alkylammonium silicates or suitably functionalized organosilanes). This modification step can render normally hydrophilic mica-type silicates organophilic. In a second step, a melt-processible polymer (or a monomer which is polymerized in situ) and the intercalated particles can be compatibilized to form a polymer with enhanced physical properties.

Nanocomposite materials are described in U.S. Pat. Nos. 4,739,007; 4,618,528; 4,528,235; 4,874,728; 4,889,885; 4,810,734; and 5,385,776; and in WO 93/11190.

SUMMARY OF THE INVENTION

The present invention addresses the need of improving the physical properties of polymer foams by providing a polymer foam that is prepared by a process comprising the steps of: a) dispersing organophilic multi-layered particles into a melt comprising an olefinic or styrenic polymer having polar functionality so that at least a portion of the polymer intercalates between layers of the particles; and b) expanding the polymer with a blowing agent under such conditions to form the polymer foam.

In a second aspect, the present invention is a polymer foam prepared by a process comprising the steps of: a) dispersing organophilic multi-layered particles into a polymerizable olefinic or styrenic monomer having polar functionality so that at least a portion of the monomer intercalates between layers of the particles; b) forming a polymer melt from the monomer; and c) expanding the polymer melt with a blowing agent under such conditions to form the polymer foam.

The polymer foam of the present invention can exhibit improved cushioning properties and enhancement in elastic recovery properties. Also, improvement in insulation and ignition resistance, superior resistance to diffusion of liquids and of gases, and enhanced impact strength can be realized in comparison to foams that are not prepared from the expansion of a suitably functionalized polymer intercalated between the layers of an organophilic multi-layered material.

DETAILED DESCRIPTION OF THE INVENTION

The polymer foam of the present invention can be prepared by the steps of dispersing organophilic multi-layered particles into a melt comprising an olefinic or styrenic polymer having polar functionality so that at least a portion of the polymer intercalates between layers of the particles; and expanding the polymer with a blowing agent under such conditions to form the polymer foam. Alternatively, the organophilic multi-layered particles can be dispersed in an olefinic or styrenic monomer or prepolymer or a combination, and the monomer or prepolymer can then be polymerized in situ prior to or concurrent with the foaming step to form the polymer foam.

Organophilic multi-layered particles suitable for the preparation of the polymer foam can be prepared from hydrophilic phyllosilicates by methods well known in the art. Illustrative of such materials are smectite clay minerals such as montmorillonite, nontronite, beidellite, volkonskoite, hectorite, saponite, sauconite, magadiite, kenyaite, and vermiculite. Other useful multi-layered particles include illite minerals such as ledikite and admixtures of illites with the clay minerals named above. Other useful multi-layered particles, particularly useful with anionic polymers, are the layered double hydroxides such as $Mg_6Al_{3.4}(OH)_{18.8}(CO_3)_{1.7}H_2O$ (see W. T. Reichle, *J. Catal.*, Vol. 94, p. 547 (1985), which have positively charged layers and exchangeable anions in the interlayer spaces. Other multi-layered particles having little or no charge on the layers may be useful in this invention provided they can be intercalated with swelling agents which expand their interlayer spacing. Such materials include chlorides such as $ReCl_3$ and $FeOCl$; chalcogenides such as $TiS_2$, $MoS_2$, and $MoS_3$; cyanides such as $Ni(CN)_2$; and oxides such as $H_2Si_2O_5$, $V_6O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$—$2H_2O$, $CaPO_4CH_3$—$H_2O$, $MnHAsO_4$—$H_2O$, and $Ag_6Mo_{10}O_{33}$.

The hydrophilic multi-layered particle can be rendered organophilic by exchange of sodium, potassium, or calcium cations with a suitable material such as a water-soluble polymer, a quaternary ammonium salt, an amphoteric surface-active agent, and a choline compound, or the like. Representative examples of exchangeable water-soluble polymers include water-soluble polymers of vinyl alcohol (for example, poly(vinyl alcohol)), polyalkylene glycols such as polyethylene glycol, water-soluble cellulosic polymers such as methyl cellulose and carboxymethyl cellulose, the polymers of ethylenically unsaturated carboxylic acids such as poly(acrylic acid) and their salts, and polyvinyl pyrrolidone.

Representative examples of the quaternary ammonium salts (cationic surface-active agents) which can be employed in this invention include the quaternary ammonium salts having octadecyl, hexadecyl, tetradecyl, or dodecyl groups; with preferred quaternary ammonium salts including dimethyl dihydrogenated tallow ammonium salt, octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, and ditetradecyl dimethyl ammonium salt.

Preferred organophilic multi-layered particles are those prepared by ion exchange of quaternary ammonium cations. A more preferred organophilic multi-layered material is a montmorillonite clay treated with a quaternary ammonium salt, most preferably dimethyl dihydrogenated tallow ammonium salt, commercially sold as CLAYTONE™ HY (a trademark of Southern Clay Products).

The organophilic multi-layered particles may also be prepared by the exchange of the sodium, potassium, or calcium cations with an inorganic material, a polymeric substance obtained by hydrolyzing a polymerizable metallic alcoholate such as $Si(OR)_4$, $Al(OR)_3$, $Ge(OR)_4$, $Si(OC_2H_5)_4$, $Si(OCH_3)_4$, $Ge(OC_3H_7)$, or $Ge(OC_2H_5)_4$, either alone, or in any combination. Alternatively, the inorganic material can be a colloidal inorganic compound. Representative colloidal inorganic compounds which can be used include $SiO_2$, $Sb_2O_3$, $Fe_2O_3$, $Al_2O_3$, $TiO_2$, $ZrO_2$, and $SnO_2$, alone, or in any combination.

The organophilic multi-layered material may also be prepared through exchange of functionalized organosilane compounds, as disclosed in WO 93/11190, pp. 9–21, which is incorporated herein by reference.

The concentration of the intercalated multi-layered particle in the polymer is application dependent, but is preferably not less than about 0.1 weight percent, more preferably not less than about 0.5 weight percent, and most preferably not less than about 1 weight percent based on the total weight of the polymer; and preferably not greater than about 40 weight percent, more preferably not greater than about 20 weight percent, and most preferably not greater than about 10 weight percent based on the total weight of the polymer.

The polymer foam is prepared, at least in part, from an olefinic or styrenic polymer having polar functionality. As used herein, the term "polar functionality" refers to a polymer that contains a group or groups having a dipole moment, such as anhydride, carboxylic acid, hydroxy, silane, chlorine, bromine, or ester functionality, or combinations thereof. The polymer containing polar functionality can be prepared, for example, by polymerizing a polymerizable monomer containing polar functionality, by copolymerizing a polymerizable monomer containing polar functionality with another polymerizable monomer, or by grafting polar functionality onto a polymer backbone. The foamed dispersion may also be prepared from a polymer having polar functionality that is blended with a polymer that does not contain polar functionality.

Styrene or olefin polymers grafted with maleic anhydride or a vinyl silane, or styrene or olefin monomers copolymerized with maleic anhydride or vinyl silanes are especially suitable inasmuch as the maleic anhydride groups or silyl groups can serve to prevent re-agglomeration of the platelet particles. Preferred vinyl silanes include vinyl-$Si(OR)_3$ where each R is independently methyl, ethyl, or propyl, more preferably methyl or ethyl, and most preferably methyl.

Styrenic polymers such as those derived from styrene, α-methyl styrene, ethyl styrene, vinyl toluene, chlorostyrene and bromostyrene, and mixtures thereof, are also suitable. These styrene monomers may be copolymerized with other ethylenically unsaturated compounds such as acrylic acid, methacrylic acid, ethacrylic acid, maleic anhydride, maleic acid, itaconic acid, methyl acrylate, methyl methacrylate, butyl acrylate, butyl methacrylate, acrylonitrile, vinyl alcohol, amides, and butadiene.

Olefin polymers include polypropylene, polyethylene, and copolymers and blends thereof, as well as ethylene-propylene-diene terpolymers. Preferred olefinic polymers for the production of foam structures include polypropylene, linear high density polyethylene (HDPE), heterogeneously-branched linear low density polyethylene (LLDPE) such as DOWLEX™ polyethylene resin (a trademark of The Dow Chemical Company), heterogeneously-branched ultra low linear density polyethylene (ULDPE) such as ATTANE™ ULDPE (a trademark of The Dow Chemical Company); homogeneously-branched, linear ethylene/α-olefin copolymers such as TAFMER™ (a trademark of Mitsui Petrochemicals Company Limited) and EXACT™ (a trademark of Exxon Chemical Company), which can be prepared as described in U.S. Pat. No. 3,645,922, the disclosure of which is incorporated herein by reference; homogeneously-branched, substantially linear ethylene/α-olefin polymers such as AFFINITY™ polyolefin plastomers (a trademark of The Dow Chemical Company) and ENGAGE™ polyolefin elastomers (a trademark of DuPont Dow Elastomers LLC), which can be prepared as disclosed in U.S. Pat. Nos. 5,272,236 and 5,278,272, the disclosure of which is incorporated herein by reference; and high pressure, free radical polymerized ethylene polymers and copolymers such as low density polyethylene (LDPE). The more preferred olefinic polymers are the homogeneously-branched linear and substantially linear ethylene copolymers with a density (measured in accordance with ASTM D-792) of about 0.85 g/cm³ to about 0.965 g/cm³, preferably from about 0.86 g/cm³ to about 0.92 g/cm³, more preferably from about 0.86 g/cm³ to about 0.90 g/cm³, and most preferably from about 0.86 g/cm³ to about 0.88 g/cm³, a weight average molecular weight to number average molecular weight ratio ($M_w/M_n$) from about 1.5 to about 3.0, a measured melt index (measured in accordance with ASTM D-1238 (190/2.16)) of about 0.1 g/10 minutes to about 100 g/10 minutes, and a melt flow ratio ($I_{10}/I_2$) of about 6 to about 20 (measured in accordance with ASTM D-1238 (190/10)).

Preferred olefin polymers functionalized with a polar group include homogeneously-branched linear and substantially linear ethylene copolymers grafted with polar functionality, ethylene-acrylic acid (EAA) copolymers such as PRIMACOR™ (a trademark of The Dow Chemical Company), ethylene-methacrylic acid (EMAA) copolymers, and ethylene-vinyl acetate (EVA) copolymers such as ESCORENE™ polymers (a trademark of Exxon Chemical Company), and ELVAX™ (a trademark of E.I. du Pont de Nemours & Co.). More preferably, the olefin polymer functionalized with a polar group comprises a substantially linear ethylene-1-$C_4$–$C_8$ alkene copolymer grafted with maleic anhydride (the preparation of which is disclosed in U.S. Pat. No. 5,346,963) or vinyl trimethoxysilane, most preferably an ethylene-1-octene copolymer grafted with maleic anhydride or vinyl trimethoxysilane and having a density of from about 0.86 g/cm³ to about 0.88 g/cm³.

Preferably, the foam is prepared from an admixture of an olefin polymer that contains polar functionality and an olefin polymer that is not functionalized. More preferably, the weight-to-weight ratio of the nonfunctionalized olefin polymer to the olefin polymer that contains polar functionality is not greater than about 10:1, most preferably not greater than about 5:1, and more preferably not less than about 1:1, most preferably not less than about 3:1.

Preferably, the concentration of the polar functional group on the polymer is not less than about 0.1 weight percent, more preferably not less than about 0.5 weight percent, and most preferably not less than about 1 weight percent, based on the total weight of the styrene or olefin monomer(s) and the polar functional group. The preferred concentration of the polar functional group is not greater than about 20 weight percent, more preferably not greater than about 15 weight percent, more preferably not greater than about 10 weight percent, and most preferably not greater than about 5 weight percent, based on the total weight of the polymer and the polar functional group.

Vulcanizable and thermoplastic rubbers used in the practice of this invention may also vary widely. Illustrative of such rubbers are brominated butyl rubber, chlorinated polyolefins such as chlorinated polyethylene and chlorinated butyl rubber, fluoroelastomers, butadiene/acrylonitrile elastomers, silicone elastomers, poly(butadiene), poly(isobutylene), sulfonated ethylene-propylene-diene terpolymers, poly(chloroprene), poly(2,3-dimethyl-butadiene), poly(butadiene-pentadiene), chlorosulfonated polyolefins such as chlorosulfonated poly(ethylenes), and poly(sulfide) elastomers.

The organophilic multi-layered particles can be dispersed in in situ polymerized monomer or prepolymer by methods known in the art, for example, as disclosed in WO 93/11190, pp. 26–28.

The mixture may include various optional components which are additives commonly employed with polymers. Such optional components include nucleating agents, fillers, plasticizers, impact modifiers, chain extenders, colorants, mold release lubricants, antistatic agents, pigments, fire retardants, and the like. These optional components and appropriate amounts are well known to those of ordinary skill in the art.

The dispersed preformed polymer melt or the polymer prepared in situ, can be made into a foam by any suitable means, such as those known in the art. A chemical blowing agent such as azodicarbonamide, 4,4'-oxybis (benzenesulfonyl hydrazide), or dinitrosopentamethylenetetramine, or a physical blowing agent such as carbon dioxide, CFCs, and light hydrocarbons, can be contacted with the polymer melt or reactive intermediates that contain the intercalated multi-layered particle to form a foamable gel, which can then be extruded through a die to form a foam product. The blowing agent may be incorporated into the polymer melt or reactive intermediates by any suitable means such as extrusion, mixing, or blending. The blowing agent is preferably mixed with the melt polymer or reactive intermediates at an elevated pressure sufficient to disperse the blowing agent substantially homogeneously therein. Surprisingly, it has been discovered that the presence of the dispersed platelets can slow down the loss of incorporated gas from the foam, thereby providing a means of maintaining the integrity of the foam.

Other methods of forming a foam are described in U.S. Pat. No. 5,340,840, from column 13, line 49 to column 14, lines 1 to 35, incorporated herein by reference along with the relevant teachings of U.S. Pat. Nos. 4,323,528; 4,379,859; and 4,464,484. Also, see K. W. Suh and D. D. Webb in "Cellular Materials," from *Encyclopedia of Polymer Science and Engineering*, Vol. 3, Second Edition, pp. 1–59 (1985), incorporated herein by reference, and C. P. Park in "Polyolefin Foams" from *Handbook of Polymeric Foams and Foam Technology*, Hanser Publishers, New York, pp. 187–242 (1991).

The foams of the present invention exhibit useful properties, for example, enhanced yield strength and tensile modulus, even when exposed to polar media such as water or methanol; enhanced heat resistance; and enhanced impact strength as compared to the foams which do not include the dispersion layered materials. The improvements in properties are obtained even though smaller amounts of the layered material are employed. It has also been surprisingly discovered that the Asker C hardness of a 0.885 g/cm$^3$ density polyolefin elastomeric resin (about 40 to 45) can be achieved, without substantially sacrificing resiliency or hysteresis of the 0.87 g/cm$^3$ density resin, by adding small amounts (less than 5 parts per hundred) of an ion-exchanged organoclay to the 0.87 g/cm$^3$ density resin grafted with a polar substituent, such as maleic anhydride or vinyl trimethoxy silane. Therefore, the desirable and unusual combination of high hardness, low hysteresis, and high resiliency can be achieved by the incorporation of the ion-exchanged organoclay material into a low density-foamed, polyolefinic material containing polar functionality.

The following examples are for illustrative purposes only, and are not meant to limit the scope of the invention.

EXAMPLE 1

VTMS-grafted Polyolefin Elastomer Bun Foams Containing Montmorillonite Organoclay Vinyl trimethoxy silane (1.5 weight percent), AFFINITY™ EG 8200 resin (98.425 weight percent), and dicumyl peroxide (0.075 weight percent) were tumble blended for 30 minutes. The mixture was then compounded on a Werner-Pfleiderer ZSK-30 co-rotating twin-screw extruder that is operated under the conditions set forth in Table I. (AFFINITY™ EG 8200 resin is a substantially linear ethylene-1-octene copolymer having a melt index of 5 g/10 minutes, a density of 0.870 g/cm$^3$, an $I_{10}/I_2$ of 7, and a $M_w/M_n$ of 2.) Zones 1 to 5 refer to extruder heater zones.

TABLE I

| | |
|---|---|
| Zone #1 (°C.) | 130 |
| Zone #2 (°C.) | 172 |
| Zone #3 (°C.) | 185 |
| Zone #4 (°C.) | 211 |
| Zone #5 (°C.) | 209 |
| Die Temperature (°C.) | 197 |
| Melt Temperature (°C.) | 225 |
| Extruder Torque | 70 |
| Extruder RPM | 100 |
| Die Pressure (psi/kPa) | 390/2690 |
| Water Bath Temp (°C.) | 15 |

The resultant polymer (AFFINITY EG 8200.g.VTMS) was used to prepared a bun formulation as set forth in Table II. CLAYTONE™ HY (a trademark of Southern Clay Products) is a montmorillonite clay treated with dimethyl dihydrogenated tallow ammonium. The coagent is SARTOMER™ 350 monomer, a trimethylolpropane trimethacrylate crosslinking coagent (a trademark of Sartomer Company). The formulation was prepared by mixing the components in a Banbury size BR internal batch mixer at 95° C. to 110° C. for 4 to 5 minutes. The mixture was then sheeted off into ¼ inch (0.6 cm) to ½ inch (1.3 cm) thick sheets on a roll mill heated to 80° C. About 200 g of the above formulation was placed into a chase with an opening of 5 inch×5 inch×0.5 inch (12.7 cm×12.7 cm×1.3 cm). The material was placed in a Tetrahedron MTP-8 compression press at 120° C. for 20 minutes at 1 ton pressure (0.56 MPa), then immediately pressed in a Carver autohydraulic press (model 3895) at 175° C. and 25 ton pressure (14 MPa) for 7 to 8 minutes. The material was then foamed at 150° C. to 160° C., using 25 tons pressure (14 MPa) for about 45 minutes. Foam density was measured by first cutting the foam into 1.5 inch×1.5 inch squares (3.8 cm$^2$×3.8 cm$^2$). The skin of the foam was then removed and the sample thickness adjusted to 0.5 inch (1.3 cm) using a Hobart slicer. Calipers were used to measure the dimensions of the squares. The sample was then weighed, and the density determined by dividing the mass by the volume. The static compression was determined by measuring the initial thickness of the sample using calipers. The sample was then compressed 50 percent using 0.25 inch (0.63 cm) spacers in a static compression set jig as described in ASTM D-395 Method B. The foam density was 0.14 g/cm$^3$±0.01, the static compression was 62 percent±4; the Asker C hardness was 43±2, as measured by an Asker C durometer; the resiliency was 59 percent±1, as measured in accordance with ASTM D-3574-86; and the hysteresis was 10.8 percent±0.1.

TABLE II

| Component | Amount (parts per hundred resin) |
|---|---|
| AFFINITY ™ EG 8200-g-VTMS resin | 100 |
| Azodicarbonamide | 3.0 |
| Zinc Stearate | 0.5 |
| Zinc Oxide | 1.0 |
| IRGANOX ™ 1010 antioxidant | 0.1 |
| Dicumyl Peroxide (40 percent active) | 1.0 |
| Coagent | 1.25 |
| Dibutyltin dilaureate | 0.01 |
| TiO$_2$ | 3.0 |
| CLAYTONE ™ HY | 4.5 |

EXAMPLE 2

VTMS-grafted Polyolefin Elastomer Bun Foams Containing Montmorillonite Organoclay The procedure for forming the bun foams that was described in Example 1 was used in this example. The formulation is set forth in Table III.

TABLE III

| Component | Amount (parts per hundred resin) |
|---|---|
| AFFINITY ™ EG 8200-g-VTMS resin | 100 |
| Azodicarbonamide | 3 |
| Zinc Oxide | 1 |
| Dicumyl Peroxide | 0.8 |
| Coagent | 2.5 |
| TiO$_2$ | 3 |
| CLAYTONE ™ HY | 3 |

The compression set was 65.3 percent±2.0 percent; the Asker C hardness was 51; and the resiliency was 58.

EXAMPLE 3

MAH-grafted Polyolefin Elastomer Bun Foams Containing Montmorillonite Organoclay Maleic anhydride (MAH) grafted onto a substantially linear ethylene-1-octene copolymer was obtained from The Dow Chemical Company. (A procedure for preparing this material was disclosed in U.S. Pat. No. 5,346,963, which was incorporated herein by reference.) The grafted material (AFFINITY™ EG 8200.g.MAH) contained 98.12 percent AFFINITY™ EG 8200, 1.4 percent MAH, 0.12 percent di-t-butyl peroxide, and 0.36 percent mineral oil. Bun foam formulations were prepared using the AFFINITY™ EG 8200.g. MAH and AFFINITY™ EG 8200. The formulation is set forth in Table IV. (IRGANOX™ is a trademark of Ciba-Geigy.)

TABLE IV

| Component | Amount (parts per hundred resin) |
|---|---|
| AFFINITY ™ EG 8200 resin | 80 |
| AFFINITY ™ EG 8200-g-MAH resin | 20 |
| Azodicarbonamide | 2.75 |

TABLE IV-continued

| Component | Amount (parts per hundred resin) |
|---|---|
| Zinc Stearate | 0.5 |
| Zinc Oxide | 1.0 |
| IRGANOX ™ 1010 antioxidant | 0.1 |
| Dicumyl Peroxide (40 percent active) | 1.5 |
| Coagent | 1.75 |
| TiO$_2$ | 3 |
| CLAYTONE ™ HY | 4.5 |

A foam was prepared from the formulation as described in Example 1. The foam density was 0.14 g/cm$^3$±0.01; the Asker C hardness was 45±2; the resiliency was 54 percent±1; and the static compression set was 80.

What is claimed is:

1. A polymer foam that is prepared by a process comprising the steps of:
   a) dispersing an organophilic multi-layered particles into a melt comprising an olefinic or styrenic polymer having polar functionality so that at least a portion of the polymer intercalates between layers of the particles; and
   b) expanding the polymer with a blowing agent under such conditions to form the polymer foam.

2. The polymer foam of claim 1 wherein the olefinic or styrenic polymer having polar functionality is an anhydride, a carboxylic acid, a hydroxy, a silane, a chlorine, a bromine, or an ester group.

3. The polymer foam of claim 1 wherein the olefinic or styrenic polymer having polar functionality is an olefinic polymer or a styrenic polymer containing a maleic anhydride group or a vinyl-Si(OR)$_3$ group grafted thereto, wherein each R is independently methyl, ethyl, or propyl, and wherein the olefinic polymer is a polypropylene; a low density polyethylene, a linear high density polyethylene; a heterogeneously-branched, linear low density polyethylene; an ethylene-propylene-diene terpolymer; a heterogeneously-branched, ultra low linear density polyethylene; a homogeneously-branched, linear ethylene/α-olefin copolymer; a homogeneously-branched, substantially linear ethylene/α-olefin polymer; a polystyrene; or a poly-α-methyl styrene.

4. The polymer foam of claim 1 wherein the organophilic multi-layered material is a quaternary ammonium salt of montmorillonite.

5. The polymer foam of claim 4 wherein the quaternary ammonium salt is selected from the group consisting of dimethyl dihydrogenated tallow ammonium salt, octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, and ditetradecyl dimethyl ammonium salt.

6. The polymer foam of claim 1 wherein the melt further comprises an olefinic or styrenic polymer that does not contain polar functionality.

7. The polymer foam of claim 6 wherein the olefin polymer that does not contain polar functionality is selected from the group consisting of a homogeneously-branched, linear ethylene/α-olefin copolymer and a homogeneously-branched, substantially linear ethylene/α-olefin polymer having a density of from about 0.85 g/cm$^3$ to about 0.965 g/cm$^3$, a M$_w$/M$_n$ of about 1.5 to about 3.0, a melt index of about 0.1 to about 100 g/10 minutes, and an I$_{10}$/I$_2$ of from about 6 to about 20.

8. The polymer foam of claim 7 wherein the organophilic multi-layered particles comprise from about 1 to about 10 weight percent of the polymer melt, based on the weight of the polymer melt.

9. The polymer foam of claim 8 wherein the polymer melt comprises a mixture of a heterogeneously-branched, substantially linear ethlylene-1-octene copolymer that is not functionalized with a polar group, and a heterogeneously-branched substantially linear ethlylene-1-octene copolymer grafted with maleic anhydride or vinyl trimethoxysilane.

10. The polymer foam of claim 9 wherein the polymer melt has a density of from about 0.86 g/cm$^3$ to about 0.88 g/cm$^3$.

11. The polymer foam of claim 10 wherein the weight-to-weight ratio of the nonfunctionalized copolymer to the grafted copolymer is in the range of about 1:1 to about 10:1.

12. The polymer foam of claim 11 wherein the weight-to-weight ratio of the nonfunctionalized copolymer to the grafted copolymer is in the range of about 3:1 to about 5:1.

13. The polymer foam of claim 1 wherein the melt comprises an olefin polymer having polar functionality which is selected from the group consisting of an ethylene-ethylene acrylic acid copolymer, an ethylene-ethylene vinyl acetate copolymer, and an ethylene-ethylene methacrylic acid copolymer.

14. A polymer foam prepared by a process comprising the steps of:
   a) dispersing organophilic multi-layered particles into a polymerizable olefinic or styrenic monomer having polar functionality so that at least a portion of the monomer intercalates between layers of the particles;
   b) forming a polymer melt from the monomer; and
   c) expanding the polymer melt with a blowing agent under such conditions to form the polymer foam.

* * * * *